US012489216B2

(12) United States Patent
Wilson et al.

(10) Patent No.: US 12,489,216 B2
(45) Date of Patent: Dec. 2, 2025

(54) POINTING CALIBRATION FOR ANTENNA

(71) Applicant: Raytheon Company, Waltham, MA (US)

(72) Inventors: Martin M. Wilson, Oklahoma City, OK (US); Jared B. Dorny, Aurora, CO (US); Sheldon C. Clark, Denver, CO (US); Timothy Robert Johnson, Strasburg, CO (US)

(73) Assignee: RAYTHEON COMPANY, Waltham, MA (US)

( * ) Notice: Subject to any disclaimer, the term of this patent is extended or adjusted under 35 U.S.C. 154(b) by 379 days.

(21) Appl. No.: 18/321,052

(22) Filed: May 22, 2023

(65) Prior Publication Data

US 2024/0396224 A1 Nov. 28, 2024

(51) Int. Cl.
*H01Q 15/16* (2006.01)
*H01Q 3/12* (2006.01)
*H01Q 3/24* (2006.01)

(52) U.S. Cl.
CPC ............... *H01Q 15/16* (2013.01); *H01Q 3/12* (2013.01); *H01Q 3/245* (2013.01)

(58) Field of Classification Search
None
See application file for complete search history.

(56) References Cited

U.S. PATENT DOCUMENTS 4,611,914 A 9/1986 Homma
7,162,200 B2 1/2007 Tsay et al.
7,382,313 B1 6/2008 Goad
10,436,941 B2 * 10/2019 Musso ................. G03B 15/006
2020/0216079 A1 * 7/2020 Mahajan ........... B60W 60/0051

FOREIGN PATENT DOCUMENTS

CN 115642965 A 1/2023

* cited by examiner

*Primary Examiner* — Darryl V Dottin
(74) *Attorney, Agent, or Firm* — CANTOR COLBURN LLP

(57) ABSTRACT

An antenna assembly is provided. The antenna assembly includes a parabolic reflector having a parabolic focal point and defining a boresight axis, a radio feed arranged on struts at the parabolic focal point and a calibration system. The calibration system includes a camera attached to the radio feed, a video feed displaying an image of an object generated by the camera, controls for centering the image in the video feed, an antenna rotator for aiming the parabolic reflector toward the object in accordance with the image being centered in the video feed and a controller. The calibration system is operable by first inputs to the controls that are reflected in the video feed and a second input to the controller to calibrate pointing of the parabolic reflector.

19 Claims, 3 Drawing Sheets

POINTING CALIBRATION FOR ANTENNA

BACKGROUND

The present disclosure relates to antennas and, in particular, to a system and method of pointing calibration for an antenna.

A directional antenna or beam antenna is an antenna that radiates or receives radio wave power in or from specific directions. Directional antennas can radiate radio waves in beams, when a greater concentration of radiation in a certain direction is desired, or can receive radio waves from one specific direction only. The capability of directional antennas to radiate or receive radio waves in or from certain directions can increase the power transmitted to receivers or reduce interference from unwanted sources. This contrasts with omnidirectional antennas, such as dipole antennas, which radiate radio waves over a wide angle or receive radio waves from a wide angle.

SUMMARY

According to an aspect of the disclosure, an antenna assembly is provided. The antenna assembly includes a parabolic reflector having a parabolic focal point and defining a boresight axis, a radio feed arranged on struts at the parabolic focal point and a calibration system. The calibration system includes a camera attached to the radio feed, a video feed displaying an image of an object generated by the camera, controls for centering the image in the video feed, an antenna rotator for aiming the parabolic reflector toward the object in accordance with the image being centered in the video feed and a controller. The calibration system is operable by first inputs to the controls that are reflected in the video feed and a second input to the controller to calibrate pointing of the parabolic reflector.

In accordance with additional or alternative embodiments, the parabolic reflector focuses radio energy to the radio feed and receives focused radio energy from the radio feed.

In accordance with additional or alternative embodiments, the video feed displays the image in real-time.

In accordance with additional or alternative embodiments, the video feed has a zoom capability.

In accordance with additional or alternative embodiments, crosshairs are superimposed on the video feed for facilitating the centering.

In accordance with additional or alternative embodiments, the crosshairs are adjustable.

In accordance with additional or alternative embodiments, the object is extremely bright and the camera and the video feed are configured to dim the object.

In accordance with additional or alternative embodiments, the controls include directional arrows associated with corresponding directional movements of the parabolic reflector by the antenna rotator.

In accordance with additional or alternative embodiments, the calibration system is configured to account for offsets between the radio feed and a boresight of the camera.

According to an aspect of the disclosure, a calibration system of an antenna assembly is provided. The calibration system includes a camera attached to a radio feed, which is arranged on struts of a parabolic reflector at a parabolic focal point of the parabolic reflector, a video feed displaying an image of an object generated by the camera, controls for centering the image in the video feed, an antenna rotator for aiming the parabolic reflector toward the object in accordance with the image being centered in the video feed and a controller. First inputs to the controls are reflected in the video feed and a second input to the controller causes the controller to calibrate pointing of the parabolic reflector.

In accordance with additional or alternative embodiments, the object is extremely bright and the camera and the video feed are configured to dim the object.

In accordance with additional or alternative embodiments, the calibration of a pointing of the parabolic reflector accounts for offsets between the radio feed and a boresight of the camera.

According to an aspect of the disclosure, a calibration method is provided for an antenna assembly in which a camera is attached to a radio feed arranged on struts of a parabolic reflector at a parabolic focal point of the parabolic reflector. The calibration method includes displaying an image of an object generated by the camera on a video feed, receiving first inputs to controls for centering the image in the video feed, aiming the parabolic reflector toward the object in accordance with the image being centered in the video feed and receiving a second input to a controller to calibrate pointing of the parabolic reflector.

In accordance with additional or alternative embodiments, the displaying of the image generated by the camera on the video feed is in real-time.

In accordance with additional or alternative embodiments, the method further includes superimposing crosshairs on the video feed for facilitating the centering.

In accordance with additional or alternative embodiments, the method further includes adjusting the crosshairs.

In accordance with additional or alternative embodiments, the object is extremely bright and the displaying includes dimming the object.

In accordance with additional or alternative embodiments, the controls include directional arrows associated with corresponding directional movements of the parabolic reflector.

In accordance with additional or alternative embodiments, the method further includes accounting for offsets between the radio feed and a boresight of the camera to calibrate pointing of the parabolic reflector.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Directional antennas, especially those that are not enclosed in radomes, require frequent pointing calibration. At higher frequencies and for larger dishes, a directional antenna being offset by even a degree can affect signal strength by orders of magnitude. At the same time, low cost, rapidly deployable antenna systems typically do not have automatic pointing calibration.

Thus, as will be described below, a commercial-off-the-shelf (COTS) camera can be attached to a radio feed of a directional antenna or a parabolic reflector and software can be used to calibrate the pointing of the parabolic reflector with reference to a given object (i.e., the sun). As such, a system is provided to calibrate pointing of a parabolic reflector based on its offset from the sun, star fields or another bright object or fixed pedestal with a known position or location. With the system in use, an operator is presented with a video feed of the camera that is attached to the radio feed. The operator has the option of pointing the parabolic reflector to the sun's current position as a rough first guess. Once the parabolic reflector is pointing at or near the sun, the operator has controls to finely tune the position of the image of the sun until the crosshairs that are superimposed on the image are directly in the middle of the sun. Once the sun is centered in the video feed, the operator instructs the system to calibrate its pointing. Offsets between the camera boresight and the radio feed can be programmed so that the system handles the offsets automatically.

Figure 1:
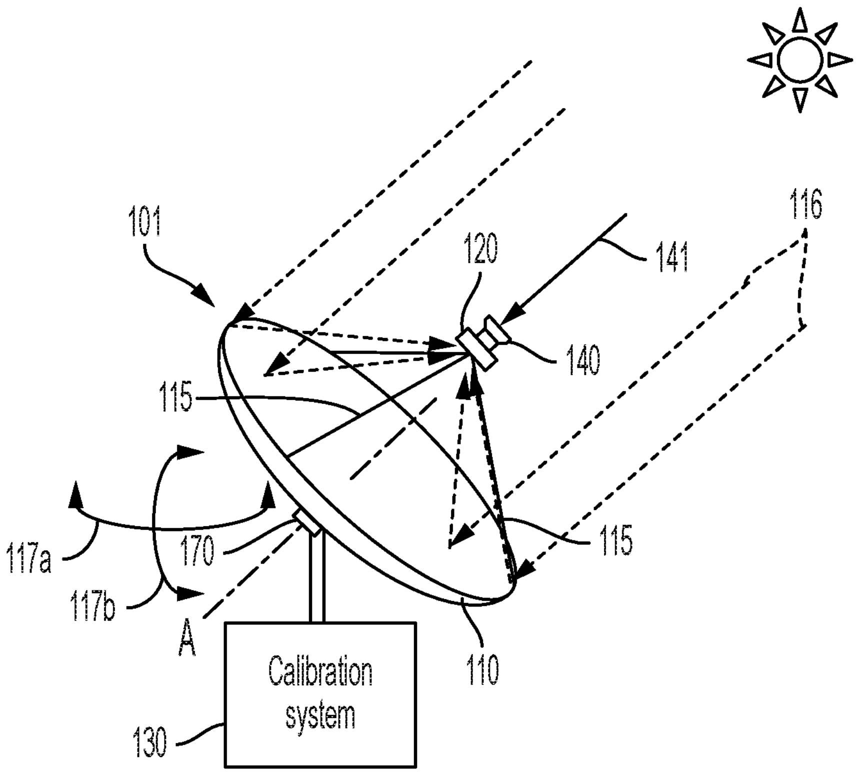
FIG. 1 is a side view of an antenna assembly in accordance with embodiments.
Figure 2:
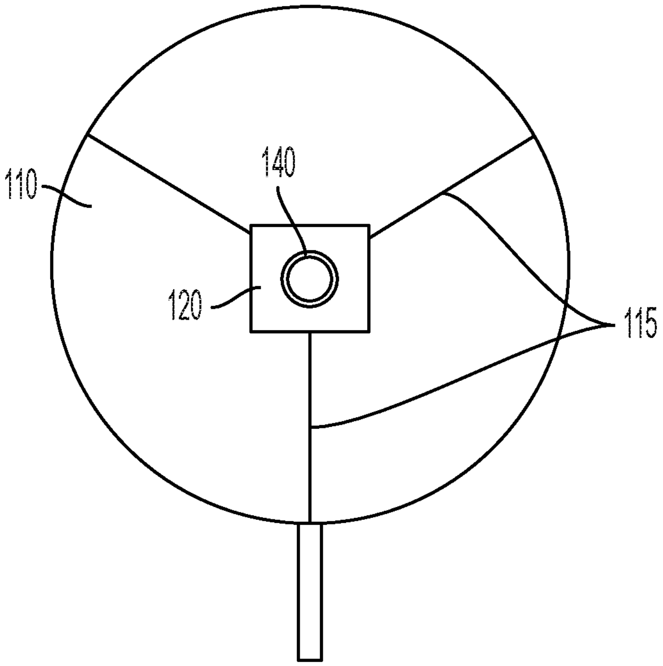
FIG. 2 is an axial view of the antenna assembly of FIG. 1 in accordance with embodiments.

With reference to FIGS. 1 and 2, an antenna assembly 101 is provided. The antenna assembly 101 includes a parabolic reflector 110 having a parabolic focal point along a boresight axis A of the paraboloid, struts 115, a strut-mounted radio feed (hereinafter referred to as a "radio feed") 120 and a calibration system 130. The radio feed 120 is arranged on the struts 115 at the parabolic focal point. The parabolic reflector 110 focuses radio waves or radio energy 116 toward the radio feed 120 at the parabolic focal point. The radio feed 10 can thus receive and/or emit radio waves, which are focused via the parabolic reflector 110 along the boresight axis A. The parabolic reflector 110 can be rotated in multiple (i.e., two) axes 117*a* and 117*b* to point in any direction above the horizon.

Figure 3:
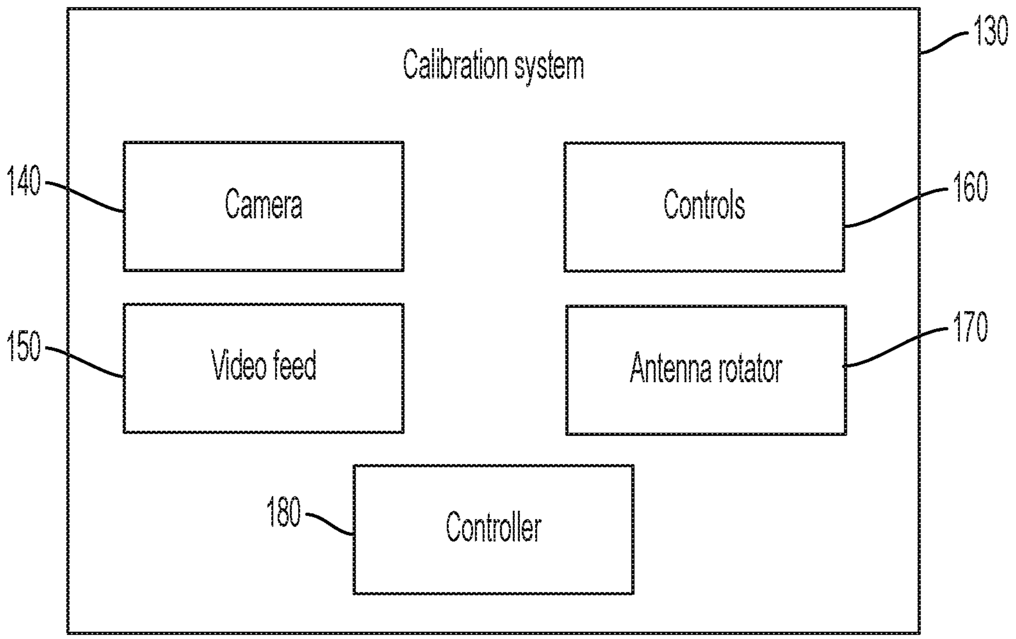
FIG. 3 is a schematic diagram of a calibration system of the antenna assembly of FIGS. 1 and 2 in accordance with embodiments.
Figure 4:
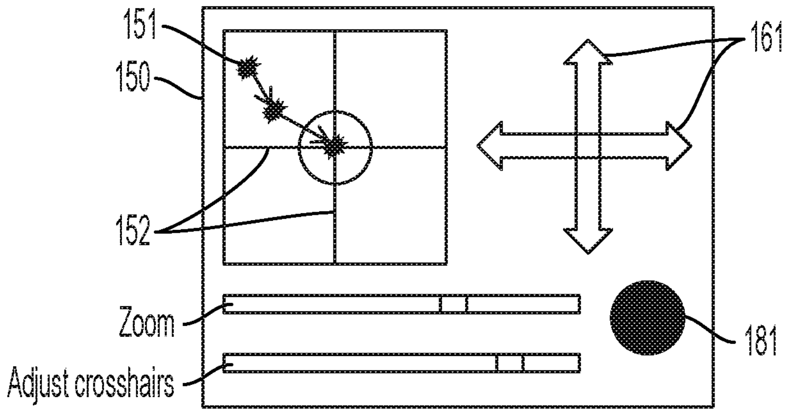
FIG. 4 is a graphical illustration of a video feed, controls and a button of a controller of the calibration system of FIG. 3 in accordance with embodiments.

With continued reference to FIGS. 1 and 2 and with additional reference to FIGS. 3 and 4, the calibration system 130 includes a camera 140, which is attached to the radio feed 120 and which has a boresight 141, a video feed 150 that displays in real-time an image 151 of an object (i.e., an extremely bright object, such as the sun or the full moon, which has a known position in the sky on a given day at a given time, a star field or a fixed pedestal having a known position or location) that is generated by the camera 140, controls 160 for centering the image in the video feed 150, an antenna rotator 170 and a controller 180.

In the cases of the object being extremely bright, the camera 140 and the video feed 150 can be configured to dim the brightness of the object so that it can be viewed safely and without causing equipment damage by an operator. The controls 160 can include directional arrows 161 that are interactively displayed in or adjacent to the video feed 150. In accordance with embodiments, the calibration system 130 can further include crosshairs 152 that are superimposed on the video feed 150 (the following description will relate to the cases in which the crosshairs 152 are superimposed on the video feed 150). The antenna rotator 170 is configured for aiming the boresight axis A of the parabolic reflector 110 and the radio feed 120 toward the object in accordance with the image 151 being centered in the video feed 150. The directional arrows 161 can be associated with corresponding directional movements of the parabolic reflector 110 by the (partially obscured) antenna rotator 170 along or about the axes 117*a* and 117*b*. The controller 180 can be provided as a processing system that is communicative with the various other components of the calibration system 130. A processing capability of the controller 180 can be provided to account for any known offsets between the radio feed 120 and the boresight 141 of the camera 140 during calibration processes.

In accordance with embodiments, the video feed 150 can be zoomed in and out and the crosshairs 152 can be adjustable according to the zoom parameter or in accordance with a type of the object being imaged.

As shown in FIG. 4, if the image 151 of the object is initially displayed in the video feed 150 above and to the left of the center of the crosshairs, the directional arrows 161 of the controls 160 for centering the image 151 in the video feed 150 may be actuated to move the image 151 downwardly and to the right. The antenna rotator 170 would thus correct the aim of the boresight axis A of the parabolic reflector 110 and the radio feed 120 upwardly and to the left in an inverse corresponding fashion to the actuation of the directional arrows 161.

During an operation of the calibration system 130, the calibration system 130 can operated by first inputs to the controls 160 for centering the image 151 in the video feed 150 and that are reflected in the video feed 150 and by a second input to a button 181 of the controller 180 to calibrate pointing of the parabolic reflector 110 and the radio feed 120 once the image 151 is centered or otherwise at a desired location in the video feed 150. As noted above, when the controller 180 calibrates the pointing of the body 110 in response to the second input being inputted and received, the controller 180 can account for any known offsets between the boresight axis A and the radio feed 120 and the boresight 141 of the camera 140.

Figure 5:
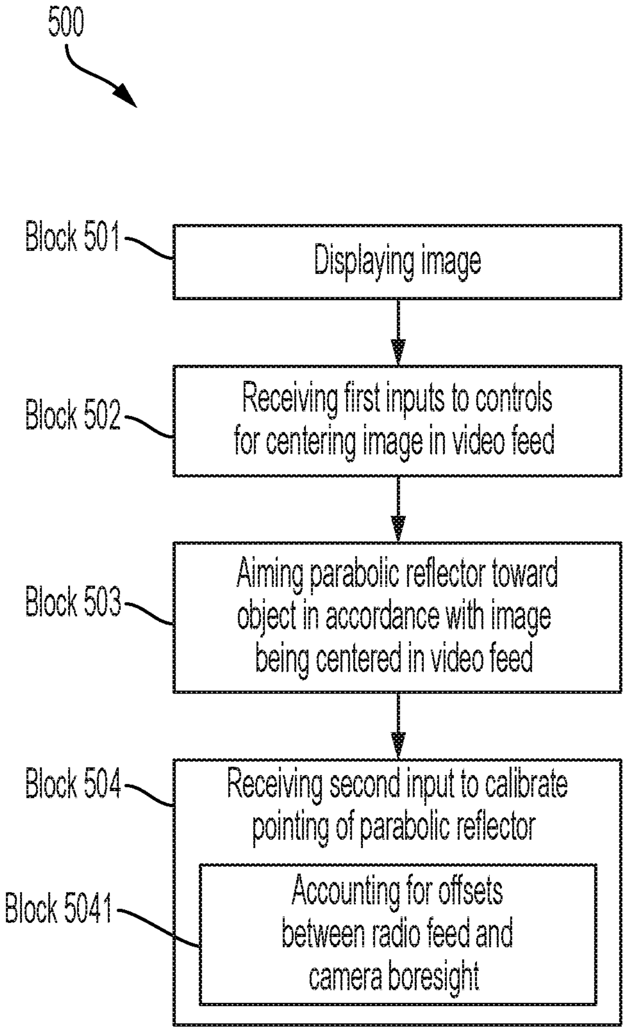
FIG. 5 is a flow diagram illustrating a calibration method of an antenna assembly in accordance with embodiments.

With reference to FIG. 5, calibration method 500 is provided for an antenna assembly in which a camera is attached to a radio feed arranged on struts of a parabolic reflector at a parabolic focal point of the parabolic reflector. The calibration method 500 includes displaying an image of an object (i.e., an extremely bright object, such as the sun or the full moon, which has a known position in the sky on a given day at a given time, a star field or a fixed pedestal having a known position or location) generated by the camera on a video feed (block 501) in real-time with a zoom capability, superimposed adjustable crosshairs and a dimming effect, receiving first inputs to controls for centering the image in the video feed (block 502), aiming the parabolic reflector and the radio feed toward the object in accordance with the image being centered in the video feed (block 503) and receiving a second input to a controller to calibrate pointing of the parabolic reflector (block 504). The calibration of the pointing of the parabolic reflector of block 504 can include accounting for offsets between the boresight axis A of the parabolic reflector and the radio feed and the boresight of the camera to calibrate pointing of the parabolic reflector (block 5041).

Technical effects and benefits of the present disclosure are the provision of a system that can be used to calibrate an antenna's pointing based on its offset from the sun or another bright object with a known position.

The corresponding structures, materials, acts and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. An antenna assembly, comprising:

a parabolic reflector having a parabolic focal point and defining a boresight axis;

a radio feed arranged on struts at the parabolic focal point; and a calibration system comprising a camera attached to the radio feed, a video feed displaying an image of an object generated by the camera, controls for centering the image in the video feed, an antenna rotator for aiming the parabolic reflector toward the object in accordance with the image being centered in the video feed and a controller, the calibration system being operable by first inputs to the controls that are reflected in the video feed and a second input to the controller to calibrate pointing of the parabolic reflector.

2. The antenna assembly according to claim 1, wherein the parabolic reflector focuses radio energy to the radio feed and receives focused radio energy from the radio feed.

3. The antenna assembly according to claim 1, wherein the video feed displays the image in real-time.

4. The antenna assembly according to claim 1, wherein the video feed has a zoom capability.

5. The antenna assembly according to claim 1, further comprising crosshairs superimposed on the video feed for facilitating the centering.

6. The antenna assembly according to claim 5, wherein the crosshairs are adjustable.

7. The antenna assembly according to claim 1, wherein the object is extremely bright and the camera and the video feed are configured to dim the object.

8. The antenna assembly according to claim 1, wherein the controls comprise directional arrows associated with corresponding directional movements of the parabolic reflector by the antenna rotator.

9. The antenna assembly according to claim 1, wherein the calibration system is configured to account for offsets between the radio feed and a boresight of the camera.

10. A calibration system of an antenna assembly, the calibration system comprising:

a camera attached to a radio feed, which is arranged on struts of a parabolic reflector at a parabolic focal point of the parabolic reflector;

a video feed displaying an image of an object generated by the camera;

controls for centering the image in the video feed;

an antenna rotator for aiming the parabolic reflector toward the object in accordance with the image being centered in the video feed; and a controller, first inputs to the controls being reflected in the video feed and a second input to the controller causing the controller to calibrate pointing of the parabolic reflector.

11. The calibration system according to claim 10, wherein the object is extremely bright and the camera and the video feed are configured to dim the object.

12. The calibration system according to claim 11, wherein calibration of a pointing of the parabolic reflector accounts for offsets between the radio feed and a boresight of the camera.

13. A calibration method for an antenna assembly in which a camera is attached to a radio feed arranged on struts of a parabolic reflector at a parabolic focal point of the parabolic reflector, the calibration method comprising:

displaying an image of an object generated by the camera on a video feed;

receiving first inputs to controls for centering the image in the video feed;

aiming the parabolic reflector toward the object in accordance with the image being centered in the video feed; and receiving a second input to a controller to calibrate pointing of the parabolic reflector.

14. The calibration method according to claim 13, wherein the displaying of the image generated by the camera on the video feed is in real-time.

15. The calibration method according to claim 13, further comprising superimposing crosshairs on the video feed for facilitating the centering.

16. The calibration method according to claim 15, further comprising adjusting the crosshairs.

17. The calibration method according to claim 13, wherein the object is extremely bright and the displaying comprises dimming the object.

18. The calibration method according to claim 14, wherein the controls comprise directional arrows associated with corresponding directional movements of the parabolic reflector.

19. The calibration method according to claim 14, further comprising accounting for offsets between the radio feed and a boresight of the camera to calibrate pointing of the parabolic reflector.

* * * * *